United States Patent [19]

Versluis

[11] 4,247,165
[45] Jan. 27, 1981

[54] FIBER OPTIC PLATE

[75] Inventor: Johannes W. Versluis, Eindhoven, Netherlands

[73] Assignee: U.S. Philips Corporation, New York, N.Y.

[21] Appl. No.: 49,529

[22] Filed: Jun. 18, 1979

[30] Foreign Application Priority Data

Jul. 6, 1978 [NL] Netherlands .................. 7807315

[51] Int. Cl.³ ............................................. G02B 5/17
[52] U.S. Cl. ............................. 350/96.27; 350/96.24
[58] Field of Search ......................... 350/96.27, 96.24

[56] References Cited

U.S. PATENT DOCUMENTS

| 2,354,591 | 7/1944 | Goldsmith | 350/96.27 |
| 3,834,803 | 9/1974 | Tsukada | 350/96.27 |
| 3,907,403 | 9/1975 | Maeda | 350/96.27 |

*Primary Examiner*—Harold A. Dixon
*Attorney, Agent, or Firm*—Marc D. Schechter

[57] ABSTRACT

In order to prevent a fiber optic window from acting as an optical diffraction grating, the window is provided with means which disturb phase relationships in incident light. A solution which does not have an adverse effect on the quality of the window is in that the fibers do not extend along straight connecting lines between the end faces. Moreover, at least one of the end faces may be provided with a frosted surface structure.

5 Claims, 3 Drawing Figures

FIBER OPTIC PLATE

BACKGROUND OF THE INVENTION

The invention relates to a fiber optic plate which is composed of a large number of fibers which are arranged in a regular pattern and which extend in parallel from a first end face to a second end face.

A fiber optic plate of this kind is known from British Pat. No. 1,470,889 and is characterized by a regular stacking of the individual fibers, by a high degree of homogeneity of the transmission over the entire plate surface, and by an absence of image distortion or other disturbing faults. When a fiber optic plate of this kind is used, for example in an optical system in which the light beam to be projected onto the fiber plate has a comparatively small angle of aperture so that light is incident at a comparatively small angle with respect to the normal, color splitting phenomena may occur in the light energing from the fiber plate. This phenomena is annoying in many cases.

SUMMARY OF THE INVENTION

The invention has for its object to eliminate this color splitting phenomena without adversely affecting the otherwise optimum image quality of the fiber optic plate. To this end, a fiber optic plate according to the invention comprises means for disturbing the phase relationship between portions of the incident light (wavelets) at each individual fiber entrance.

The invention is based on the assumption that the color splitting occurring is due to the occurrence of diffraction phenomena in the light, because the fiber plate acts as an optical diffraction grating. This assumption is based on the phenomenon that less color splitting occurs in fiber plates having a less regular stacking of the individual fibers or when a light beam is incident at a comparatively large angle with respect to the normal of the plate (i.e. with respect to the axis of the individual fibers).

Because the phase relationships between the wavelets are disturbed in a fiber-optic plate according to the invention, during the passage of the light through the plate, the plate will no longer act as a diffraction grating and there will be no color splitting.

In a preferred embodiment according to the invention, each individual fibers is oriented, at least over a part of its length, at an angle with respect to the perpendicular connection between the two parallel end faces. As a result, the phase relationships between the wavelets are disturbed during passage through the plate, so that no regularity in the mutual phase relationship and hence no visible diffraction phenomena occur at the exit side. Plates of this kind can be formed by sawing at an angle.

In a further preferred embodiment, the phase relationships are disturbed by providing a plate in which the optical lengths of the individual fibers are mutually unequal. The optical fibers thus have a plurality of different optical lengths.

In yet a further preferred embodiment, the phase relationships are disturbed by providing a plate in which at least one of the end faces of the fiber plate is frosted. An advantage of this embodiment is that frosting can be performed on each plate after completion of the entire production process and, if desired, it can be performed on each plate side.

Some preferred embodiments of fiber plates according to the invention will be described in detail hereinafter with reference to the accompanying diagrammatic drawing.

DESCRIPTION OF THE PREFERRED EMBODIMENTS

Figure 1:
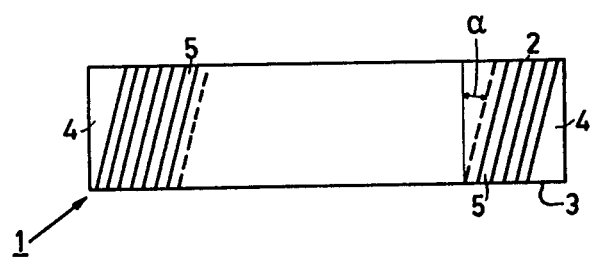
FIG. 1 is a longitudinal sectional view of a fiber plate according to the invention, comprising fibers extending at an angle.

A fiber plate 1 as shown in FIG. 1 has, for example, a diameter of 25 mm on both sides thereof and a thickness of approximately 1 mm, measured between two end faces 2 and 3. End faces 2 and 3 have substantially equal surface areas. A jacket portion 4 of the fiber plate may be made of an homogeneous glass. Individual fibers 5, shown in a plan view in FIG. 2 with exaggerated dimensions, have, for example, a thickness of 10 $\mu$m and comprise (not separately shown) a core of glass having a refractive index of, for example, 1.8 and a jacket of glass having a refractive index of, for example, 1.5. In the embodiment shown, the direction of the fibers encloses acute angle $\alpha$ with respect to the normal to the end faces. An attractive value of the angle $\alpha$ is situated in the range of from approximately 3° to approximately 15° and can be adapted to the optical application of the plate. In principle, the angle $\alpha$ will be chosen as small as possible in order to minimize transmission reduction and image shifting. Image shifting can be prevented by using a double fibre plate in which the fibres extend at an angle in opposite directions. Image shifting can also be prevented by arranging the fibers so that they do not extend at an angle in a straight line, but are bent together. In the latter case, it must be ensured that all fibers remain parallel with respect to each other. In some applications it may be desirable to have the individual fibers terminate at right angles to an end face, for example, the end face which acts as the exit face of the fiber plate in the system.

In a preferred embodiment according to the invention, in which basically rectangular fibers extend at an angle, or in a curved manner, between the two end faces, the direction of inclination of the fibers preferably coincides approximately, but not exactly, with the direction of the diagonal of the planar cross-section of the fiber. (See, FIG. 2.) A comparatively small inclination angle suffices in this direction.

Figure 2:
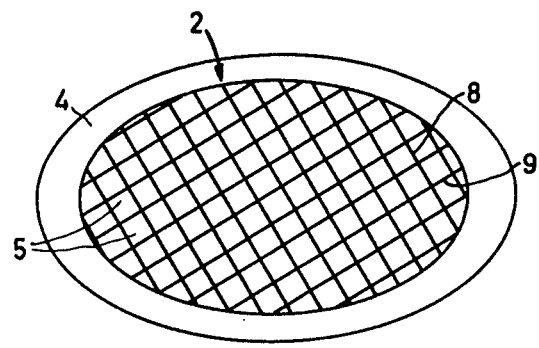
FIG. 2 is a plan view of a fiber optic plate.
Figure 3:
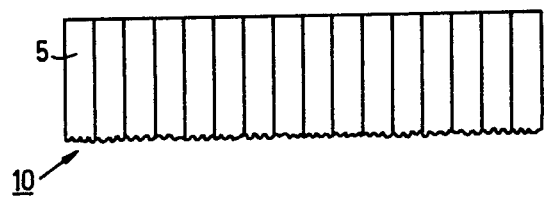
FIG. 3 is longitudinal sectional view of a fiber optic plate according to the invention, having a frosted end face.

FIG. 3 shows only a relevant end part of a fiber plate of another preferred embodiment according to the invention. In an end face 10 there is provided a surface structure in which the ends of the fibers are no longer identical, so that an originally existing phase relationship is lost. When a structure of this kind is provided, the structure extends over only a limited depth, for example equal to at most one fiber diameter. The fiber surface structure present should not be periodic. The direction of a sinusoidal structure, therefore, should not, for example, coincide with fiber boundaries 8 and 9 as shown in FIG. 2. Moreover, the pitch of the structure preferably deviates from an integral number of core dimensions, measured in the direction of the fiber pattern. When such a structure, which corresponds as little as possible, is provided on both end faces, a more pronounced disturbance of the regularity can be achieved. On the other hand, each of the structures may be less pronounced.

A further advantage of the preferred embodiments where a disturbing element is added to a direct-vision fiber plate is that any type of plate can be formed from a single stock of fiber plates, it being possible to obtain one particular shape during the cutting of the fiber plates.

In a preferred embodiment according to the invention which satisfies this requirement, at least one of the end faces is lightly frosted, with the result that an irregular disturbance similar to that described with reference to FIG. 3 is obtained. A drawback is that the optical quality of the fiber plate is affected by this operation. Depending on the application, this will be permissible or not. An advantage of the latter embodiment is that the disturbance can be comparatively readily realized, for example, by light grinding by means of a comparatively fine grinding agent.

What is claimed is:

1. A fiber optic plate comprising a plurality of optical fibers extending from a first end face to a second end face, said first and second end faces being parallel and having the same surface area, CHARACTERIZED IN THAT at least a portion of substantially all of the fibers is oriented at an acute angle with respect to the normal to the end faces such that the phase relationships between wavelets incident on the plate are disturbed.

2. A fiber optic plate as claimed in claim 1, wherein at least an end portion of substantially all of the fibers is oriented at an acute angle with respect to the normal to the end faces.

3. A fiber optic plate as claimed in claim 2, the individual fibers are straight and extend at an angle between the two end faces.

4. A fiber optic plate as claimed in claim 2, wherein the individual fibers are bent together and are oriented at an acute angle at at least one of the end faces.

5. A fiber optic plate as claimed in claim 3 or 4, wherein the fibers are oriented, at at least one end face, at an angle of between approximately 3° and 15° with respect to the normal to the end face.

* * * * *

UNITED STATES PATENT OFFICE
CERTIFICATE OF CORRECTION

Patent No. 4,247,165                     Dated January 27, 1981

Inventor(s) JOHANNES W. VERSLUIS

It is certified that error appears in the above-identified patent and that said Letters Patent are hereby corrected as shown below:

Col. 4, line 13, After "2," insert -- wherein --

Signed and Sealed this

Twelfth Day of May 1981

[SEAL]

*Attest:*

RENE D. TEGTMEYER

*Attesting Officer*     *Acting Commissioner of Patents and Trademarks*